(12) United States Patent
Carey

(10) Patent No.: US 10,972,269 B2
(45) Date of Patent: Apr. 6, 2021

(54) SYSTEMS AND METHODS FOR TOKEN VAULT SYNCHRONIZATION USING A DISTRIBUTED LEDGER

(71) Applicant: JPMorgan Chase Bank, N.A., New York, NY (US)

(72) Inventor: David Christopher Carey, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 199 days.

(21) Appl. No.: 16/126,201

(22) Filed: Sep. 10, 2018

(65) Prior Publication Data
US 2019/0081784 A1 Mar. 14, 2019

Related U.S. Application Data

(60) Provisional application No. 62/556,530, filed on Sep. 11, 2017.

(51) Int. Cl.
 G06Q 20/36 (2012.01)
 H04L 9/32 (2006.01)
 H04L 9/12 (2006.01)
 G06Q 20/06 (2012.01)

(52) U.S. Cl.
 CPC .............. *H04L 9/12* (2013.01); *G06Q 20/06* (2013.01); *G06Q 20/3672* (2013.01); *G06Q 20/3674* (2013.01); *G06Q 20/3678* (2013.01); *H04L 9/3239* (2013.01); *G06Q 2220/00* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 2015/0363772 A1* | 12/2015 | Ronca | G06Q 20/065 705/71 |
| 2017/0124556 A1* | 5/2017 | Seger, II | H04L 69/40 |
| 2017/0230189 A1 | 8/2017 | Toll et al. | |

(Continued)

OTHER PUBLICATIONS

U.S. Appl. No. 15/298,328, filed Oct. 2016, Zwink et al.
(Continued)

*Primary Examiner* — J. Brant Murphy
*Assistant Examiner* — Hassan Saadoun
(74) *Attorney, Agent, or Firm* — Greenberg Traurig LLP

(57) ABSTRACT

Systems and methods for token vault synchronization using a distributed ledger are disclosed. In one embodiment, in a distributed token ledger network comprising a plurality of nodes, each node associated with a token ledger and comprising at least one computer processor, a method for token vault synchronization using a distributed ledger may include: (1) a node receiving a lifecycle event for a payment token; (2) the node writing the lifecycle event to a token ledger for the node; (3) committing the lifecycle event to the distributed token ledger after the plurality of nodes in the distributed token ledger agree to committal; (4) a watcher at the node detecting the commitment of the lifecycle event to the distributed token ledger; and (5) the watcher communicating the lifecycle event to a non-node participant.

19 Claims, 6 Drawing Sheets

(56) References Cited

U.S. PATENT DOCUMENTS

2018/0046992 A1 2/2018 Hanrahan et al.
2018/0047111 A1 2/2018 Vieira et al.

OTHER PUBLICATIONS

U.S. Appl. No. 15/332,025, filed Oct. 2016, Dakshi et al.
International Searching Authority, PCT International Search Report and PCT Written Opinion, International Application No. PCT/US18/50207, dated Nov. 19, 2018, pp. 1-8.

* cited by examiner

SYSTEMS AND METHODS FOR TOKEN VAULT SYNCHRONIZATION USING A DISTRIBUTED LEDGER

RELATED APPLICATIONS

This application claims priority to U.S. Provisional Patent Application Ser. No. 62/556,530, filed Sep. 11, 2017, the disclosure of which is hereby incorporated, by reference, in its entirety.

BACKGROUND OF THE INVENTION

1. Field of the Invention

The present invention generally relates to systems and methods for token vault synchronization using a distributed ledger.

2. Description of the Related Art

Tokens are used as a security measure when conducting a transaction using, for example, a mobile wallet hosted by a mobile electronic device, such as a smartphone. Rather than conduct a transaction using a customer's primary account number (PAN), a token, which is a surrogate for the PAN, is used.

A token vault, which is a secure centralized server that stores the PANs and tokens, as well as their mappings. The token vault is maintained by a token service provider, or TSP. Credit card associations, such as Visa and MasterCard, often provide TSP services.

SUMMARY OF THE INVENTION

Systems and methods for token vault synchronization using a distributed ledger are disclosed. In one embodiment, in a distributed token ledger network comprising a plurality of nodes, each node associated with a token ledger and comprising at least one computer processor, a method for token vault synchronization using a distributed ledger may include: (1) a node receiving a lifecycle event for a payment token; (2) the node writing the lifecycle event to a token ledger for the node; (3) committing the lifecycle event to the distributed token ledger after the plurality of nodes in the distributed token ledger agree to committal; (4) a watcher at the node detecting the commitment of the lifecycle event to the distributed token ledger; and (5) the watcher communicating the lifecycle event to a non-node participant.

In one embodiment, the node may receive the lifecycle event from an issuer of a financial instrument associated with the payment token.

In one embodiment, the non-node participant may be associated with a card association.

In one embodiment, the non-node participant may maintain a local token vault.

In one embodiment, the distributed token ledger may be a Blockchain-based distributed ledger.

In one embodiment, the payment token may be an issued payment token.

In another embodiment, in a distributed token ledger network comprising a plurality of nodes, each node maintaining a token ledger and comprising at least one computer processor, a method for token vault synchronization using a distributed ledger may include: (1) a middleware services layer receiving a token event for a payment token from a non-node participant; (2) the middleware services layer writing the token event to an associated token ledger; (3) committing the token event to the distributed token ledger after the plurality of nodes in the distributed token ledger agree to committal; (4) a watcher at the node detecting the commitment of the token event to the distributed token ledger; and (5) the watcher communicating the token event to a non-node participant.

In one embodiment, the non-node participant may be associated with a card association.

In one embodiment, the non-node participant may maintain a local token vault.

In one embodiment, the distributed token ledger may be a Blockchain-based distributed ledger.

In one embodiment, the payment token may be an issued payment token.

In one embodiment, the token event may include a token lifecycle event, a token provisioning event, etc.

According to another embodiment, a system for providing a distributed-ledger based token vault may include a distributed token ledger network comprising a plurality of nodes, each node associated with a token ledger and comprising at least one computer processor, and a node participant associated with each node. One the plurality of node participants may write a token event for a payment token to the associated token ledger, and the plurality of nodes may agree to commit the token event to the distributed token ledger. The distributed token layer may be used as a token vault by at least one of the node participants.

In one embodiment, the distributed token ledger may be a Blockchain-based distributed ledger.

In one embodiment, the payment token may be an issued payment token.

In one embodiment, the token event may include a token lifecycle event, a token provisioning event, etc.

In one embodiment, the system may further include a middleware services layer associated with one of the plurality of nodes, and a non-node participant in communication with the middleware services layer. The non-node participant may maintain a local token vault.

In one embodiment, one of the plurality of nodes may include a watcher that detects the commitment of the token event to the distributed token ledger and communicates the token event to the non-node participant.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

The following documents are hereby incorporated by reference in their entireties: U.S. Patent Application Ser.

Nos. 62/414,398; 62/340,295; 62/232,989; 62/316,841; Ser. Nos. 15/233,719; 15/234,263; 15/332,025; and 15/298,328.

Embodiments disclosed herein are directed to systems and methods for token vault synchronization with a distributed ledger. In one embodiment, a third party token service provider may be used as a TSP instead of a credit card association's TSP capabilities.

The use of a third party TSP may require the synchronization of a plurality of token vaults. For example, the credit card association, the issuing bank, and the TSP may each maintain one or more token vaults. These token vaults may be synchronized using, for example, electronic messaging.

In one embodiment, distributed ledger technology may be used to synchronize the token vaults and simplify the synchronization. For example, each token vault may exist as a node in a distributed ledger, and may be associated with, for example, issuing banks, credit card associations, the TSP, etc. When a node receives a request to create, modify, or delete a token, it submits that action to the other nodes for verification. Once agreed, all peers update their distributed ledgers with the latest token information at the same, or at substantially the same, time.

Figure 1:
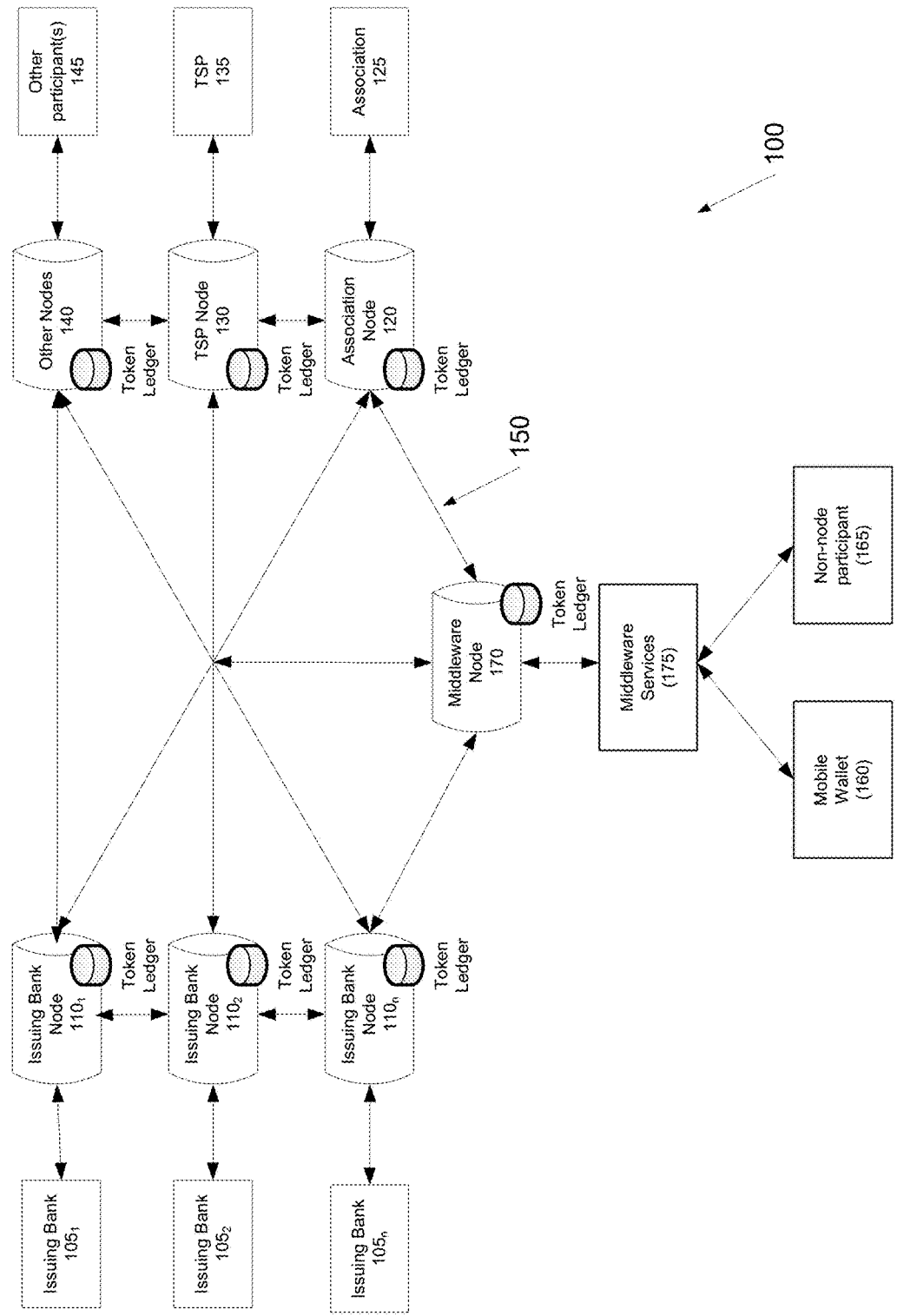
FIG. 1 depicts a system for token vault synchronization using a distributed ledger according to one embodiment.

Referring to FIG. 1, a system for token vault synchronization using a distributed ledger is disclosed according to one embodiment. System 100 may include network 150, which may be include a plurality of nodes $110_1$, $110_2$, ... $110_n$, 120, 130, 148, 170, etc. Each node may maintain a copy of a distributed token ledger, which may be any suitable ledger. In one embodiment, the token ledgers may be cryptographically-verifiable, immutable ledgers such as a blockchain-based ledger. Other types of ledgers may be used as is necessary and/or desired.

As used herein, the term "token ledger" is intended to cover the distributed token ledgers at each node 110, 120, 130, 148, 170, etc.

In one embodiment, the token ledgers may store payment token information.

Each node $110_1$, $110_2$, ... $110_n$, 120, 130, 140, 170, etc. may be associated with one or more entity. For example, issuing banks $105_1$, $105_2$, $105_n$ may interact with nodes $110_1$, $110_2$, ... $110_n$, respectively. In one embodiment, each issuing bank 105 may have one or more internal or external nodes participating.

Credit card association 125 (e.g., Visa, Mastercard, etc.) may access the token ledger using association node 120. In one embodiment, association 125 may participate as a node (e.g., node 120), or may access the token ledger using through middleware services 175, which may include API(s), ISO(s) (e.g., ISO0100, ISO0600, etc.), or web service(s).

Token service provider 135 may interact with the token ledger using TSP node 130.

Other participants 145 may interact with the token ledger using node 140.

Other entities may access the token ledger using middleware services 175. In one embodiment, mobile wallet 160 may access the token ledger in middleware node 170 using middleware services 175. Mobile wallet 160 may accept updates from nodes 110, 120, 130, 140 and may communicate user-issued changes to the token ledger, such as provisioning, suspending, etc.

In one embodiment, middleware services 175 may push information to non-node participants, such as association 125, other participants 145, etc.

In one embodiment, non-node participants 165 (e.g., participants that are not accessing the token ledger via a node) may access the token ledger in middleware node 170 using middleware services 175.

In one embodiment, middleware services 175 may be provided by one of issuing banks 110. Middleware services 175 may expose information on the token ledger through various APIs. These services may be used to read from and submit changes (e.g., transactions) to the token ledger in real time.

In one embodiment, for non-participating entities, issuing banks 110 may expose information on token ledger 150 through, for example, APIs. These APIs may be used to read from and submit changes to the tokens, transactions, etc. to token ledger 150.

In one embodiment, some or all nodes 110, 120, 130, 140, 170, etc. may communicate changes to the token ledger where they may be verified and accepted across all participants before being committed to the token ledger. Nodes 110, 120, 130, 140, 170, etc. may be responsible to verifying change requests, and some or all may issue changes to token ledger.

Figure 2:
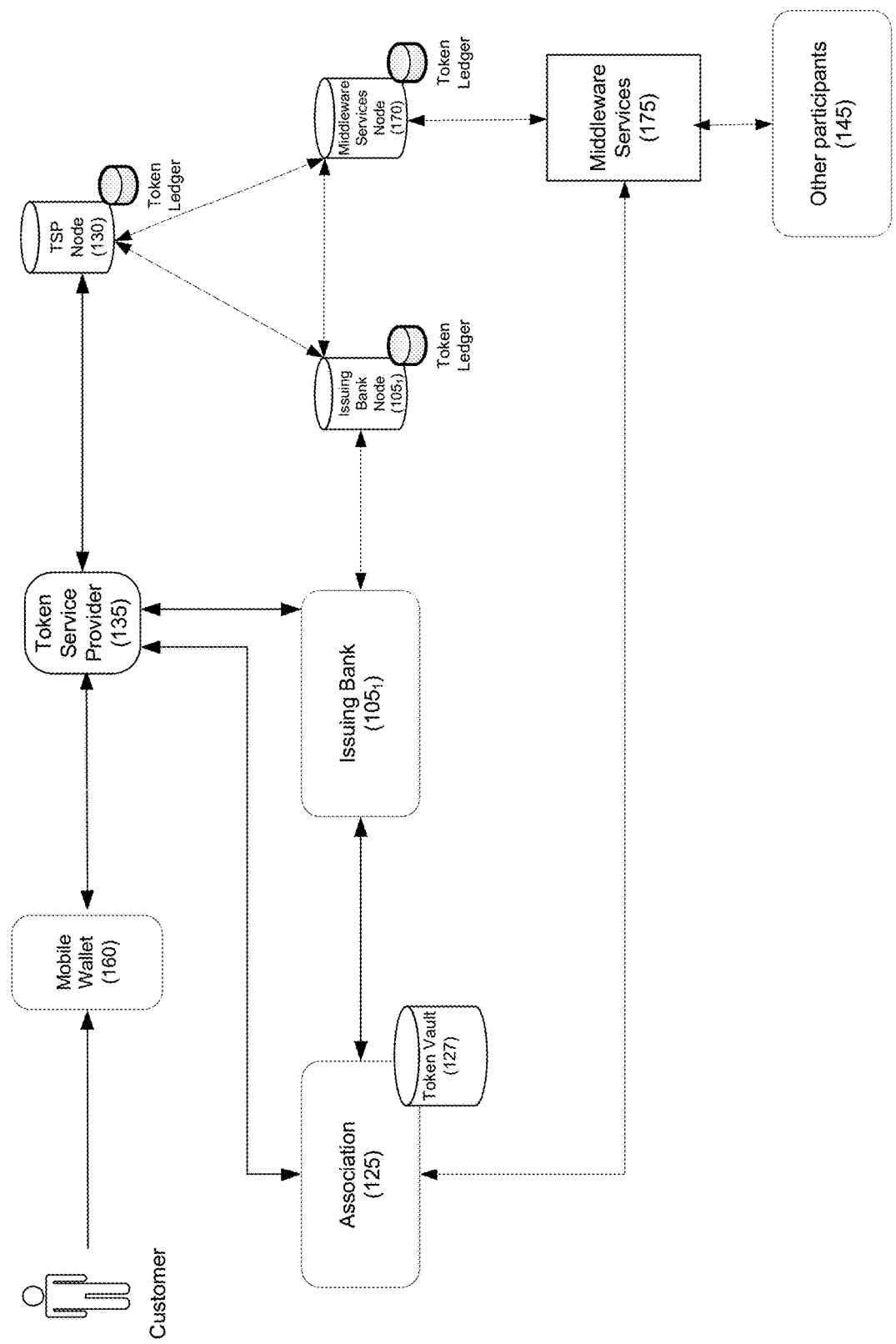
FIG. 2 depicts an embodiment in which a credit card association participates with a token ledger via a middleware services layer according to one embodiment.

Referring to FIG. 2, an embodiment in which credit card association 125 accesses the token ledger using a middleware services layer 170 is provided. In one embodiment, credit card association 125 may receive real-time messaging from issuing bank 105 and/or a token service provider 135.

In one embodiment, middleware services 175 may be provided for non-node participants 145 so that they can be notified of and submit events (e.g., changes) to the token ledger. For example, an issuing bank's applications that do not participate as a node with token ledger 150 may submit queries, updates, changes, etc. using middleware services 175.

In one embodiment, any events including a token (e.g., provisionings, lifecycle events, deletions, transactions, cryptogram key management, etc.) may be submitted to, and the committed to, the token ledger. In one embodiment, token vault 127 may be updated to reflect any events to a token in token ledger 150, such as lifecycle events. For example, a watcher (not shown) may be used to communicate changes to the token ledger to association 125 so that token vault 127 may be updated. The watcher may be provided by any suitable entity or node. For example, the watcher may be provided by TSP 135.

Any events involving a token in token vault 127 may be reflected in token ledger 150. These events may be written to, and then committed to, the token ledger using middleware services 175.

Figure 3:
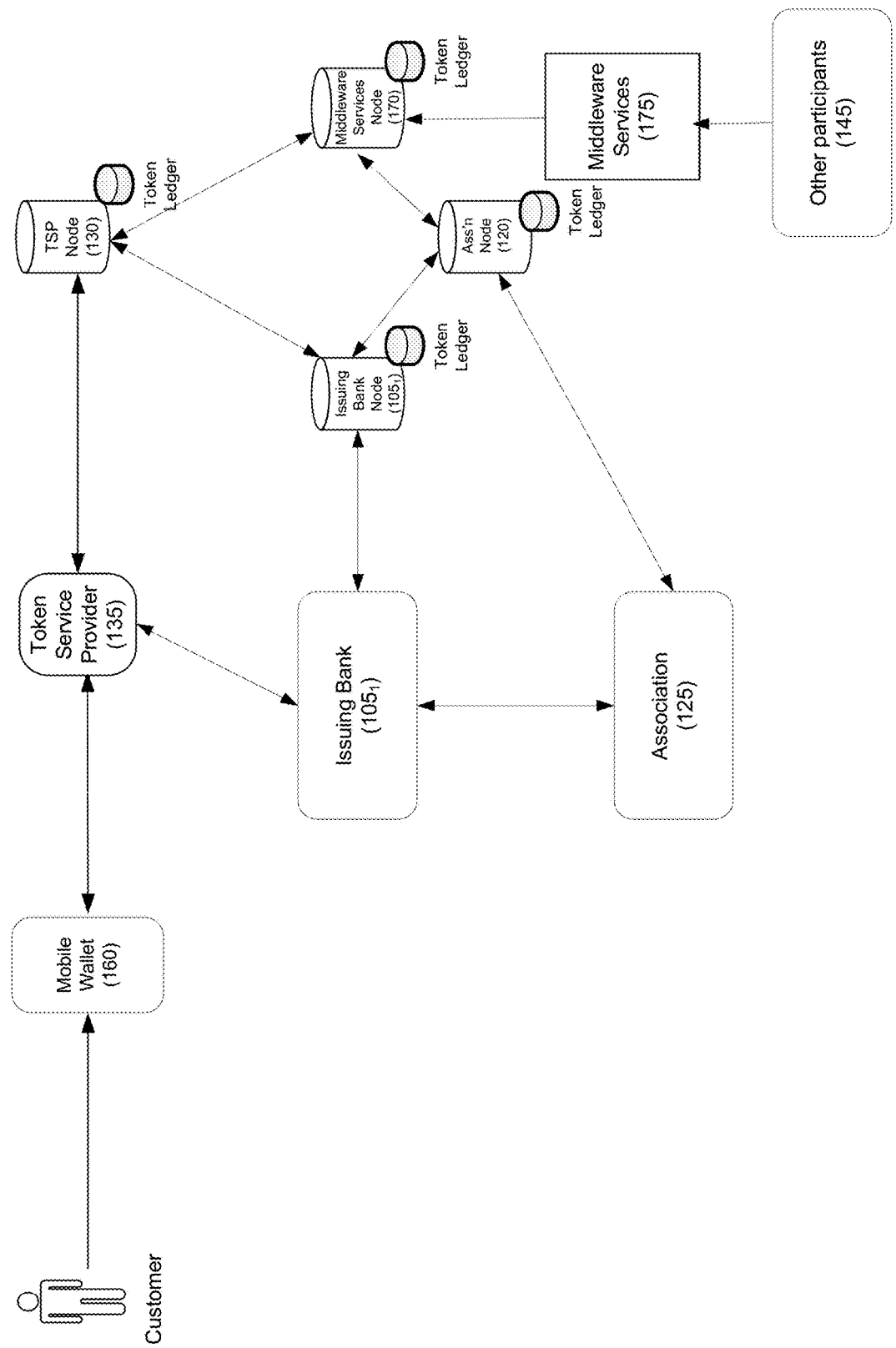
FIG. 3 depicts an embodiment in which a credit card association participates with a token ledger as a node according to one embodiment.

Referring to FIG. 3, an embodiment in which credit card association 125 participates as node 120 is provided according to one embodiment.

Figure 4:
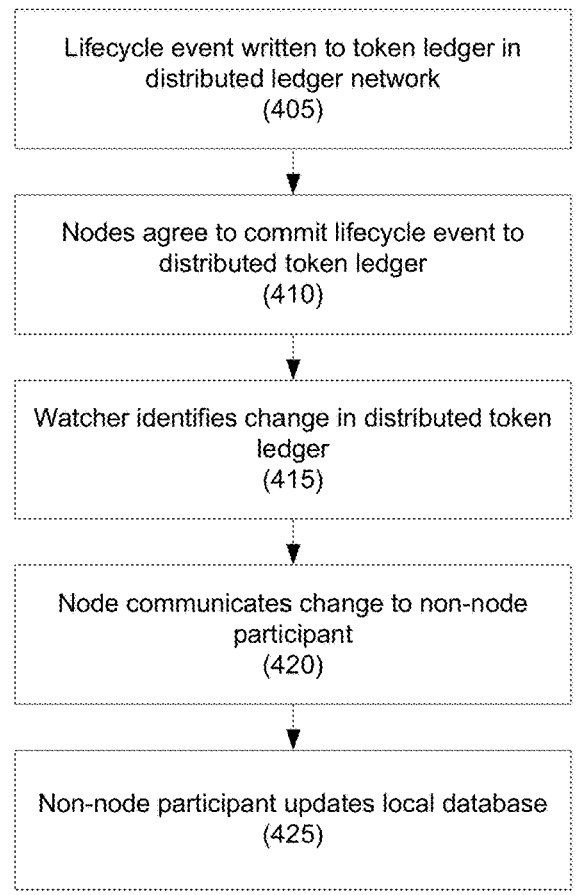
FIG. 4 depicts a method for token vault synchronization using a distributed ledger according to one embodiment.

In one embodiment, any events including a token (e.g., provisionings, lifecycle events, deletions, transactions, cryptogram key management etc.) may be written to, and then committed to, the token ledger. Because association 125 participates as node 120, a separate token vault is not required Referring to FIG. 4, a method for token vault synchronization using a distributed ledger is disclosed according to one embodiment.

In step 405, a node participant may submit a lifecycle event for a payment token to a token ledger in a distributed token ledger network. In one embodiment, the token ledger may be a cryptographically-verifiable, immutable ledger, such as a Blockchain-based ledger.

In one embodiment, the lifecycle event may involve an event involving an issued payment token, such as a change in the primary account number, change in expiration data, token expiration, token deactivation, cryptogram key management, etc.

In step 410, the nodes of the distributed token ledger network may agree to commit the lifecycle event to the distributed token ledger.

In step 415, a watcher at one of the nodes, or an entity associated with one of the nodes, may monitor the distributed token ledger for commitments so that it may inform one or more non-node participant, such as an association, so that the non-node participant may update its databases (e.g., the association's token vault). In one embodiment, a token service provider may provide such a watcher.

In step 420, the node associated with the watcher may communicate the lifecycle event to the non-node participant, and in step 425, the non-node participant may update its local database (e.g., the token vault).

Figure 5:
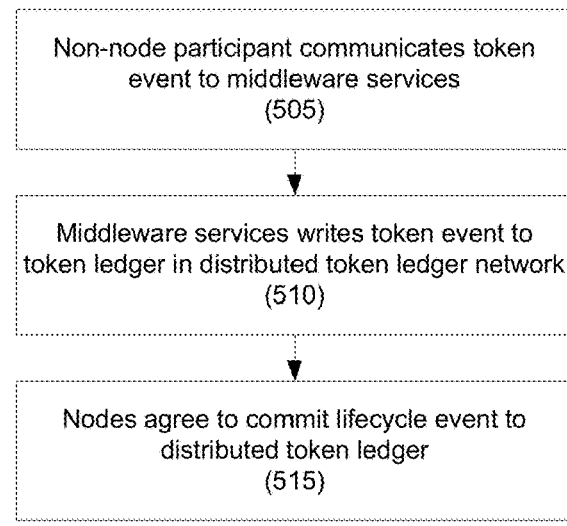
FIG. 5 depicts a method for token vault synchronization using a distributed ledger according to one embodiment.

Referring to FIG. 5, a method for token vault synchronization using a distributed ledger is disclosed according to one embodiment.

In step 505, a non-node participant may communicate a token event to a middleware services layer. In one embodiment, the token event may include token provisioning, lifecycle events, etc.

In step 510, the middleware services layer may write the token event to an associated token ledger in a distributed token ledger network. In one embodiment, the token ledger may be a cryptographically-verifiable, immutable ledger, such as a Blockchain-based ledger.

In step 515, the nodes of the network may agree to commit the lifecycle event to the distributed token ledger network.

Figure 6:
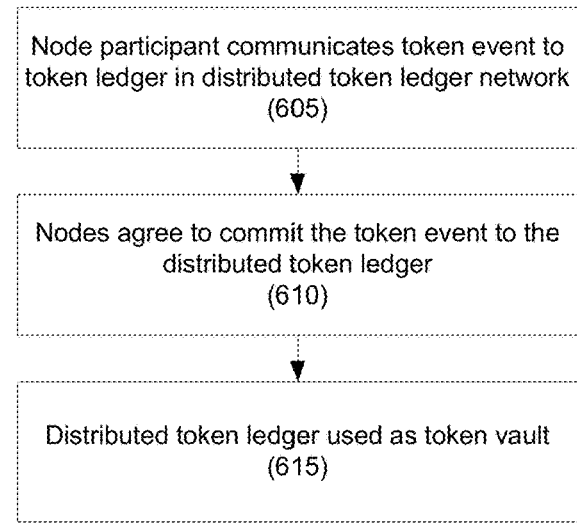
FIG. 6 depicts a method for using a distributed ledger as a token vault according to one embodiment.

Referring to FIG. 6, a method for using a distributed ledger as a token vault is disclosed according to one embodiment.

In step 605, a node participant in a distributed token ledger network may write a token event to an associated token ledger in the distributed token ledger network. In one embodiment, the token event may include token provisioning, lifecycle events, cryptogram key management, etc.

In step 610, the nodes of the distributed token ledger network may agree to commit the token event to the distributed token ledger.

In step 615, the distributed token layer may be used as the token vault by at least one of the node participants.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for token vault synchronization using a distributed ledger comprising:
   in a distributed token ledger network comprising a plurality of nodes, each node associated with a token ledger and comprising at least one computer processor:
   a node receiving a lifecycle event for a payment token, wherein the lifecycle event includes at least one of a change in a primary account number event, a change in an expiration data event, a payment token expiration event, a token deactivation event, and a cryptogram key management event;
   the node writing the lifecycle event to a token ledger for the node;
   committing the lifecycle event to the distributed token ledger after the plurality of nodes in the distributed token ledger agree to committal;
   a watcher at the node detecting the commitment of the lifecycle event to the distributed token ledger; and
   the watcher communicating the lifecycle event to a non-node participant.

2. The method of claim 1, wherein the node receives the lifecycle event from an issuer of a financial instrument associated with the payment token.

3. The method of claim 1, wherein the non-node participant is associated with a card association.

4. The method of claim 3, wherein the non-node participant maintains a local token vault.

5. The method of claim 1, wherein the distributed token ledger is a Blockchain-based distributed ledger.

6. The method of claim 1, wherein the payment token is an issued payment token.

7. A method for token vault synchronization using a distributed ledger comprising:
   in a distributed token ledger network comprising a plurality of nodes, each node maintaining a token ledger and comprising at least one computer processor:
   a middleware services layer receiving a token lifecycle event for a payment token from a non-node participant, wherein the token lifecycle event includes at least one of a change in a primary account number event, a change in an expiration data event, a payment token expiration event, a token deactivation event, and a cryptogram key management event;
   the middleware services layer writing the token lifecycle event to an associated token ledger;
   committing the token lifecycle event to the distributed token ledger after the plurality of nodes in the distributed token ledger agree to committal;
   a watcher at the node detecting the commitment of the token lifecycle event to the distributed token ledger; and
   the watcher communicating the token lifecycle event to a non-node participant.

8. The method of claim 7, wherein the non-node participant is associated with a card association.

9. The method of claim 8, wherein the non-node participant maintains a local token vault.

10. The method of claim 7, wherein the distributed token ledger is a Blockchain-based distributed ledger.

11. The method of claim 7, wherein the payment token is an issued payment token.

12. The method of claim 7, wherein the token lifecycle event further comprises a token provisioning event.

13. A system for providing a distributed-ledger based token vault, comprising:
    a distributed token ledger network comprising a plurality of nodes, each node associated with a token ledger and comprising at least one computer processor;
    a node participant associated with each node;
    wherein:
      one of the plurality of node participants writes a token lifecycle event for a payment token to the associated token ledger, wherein the token lifecycle event includes at least one of a change in a primary account number event, a change in an expiration data event, a payment token expiration event, a token deactivation event, a payment token provisioning event, and a cryptogram key management event; and
      the plurality of nodes agree to commit the token lifecycle event to the distributed token ledger;
      wherein the distributed token layer is used as a token vault by at least one of the node participants.

14. The system of claim 13, wherein the distributed token ledger is a Blockchain-based distributed ledger.

15. The system of claim 13, wherein the payment token is an issued payment token.

16. The system of claim 13, wherein the token lifecycle event further comprises a token provisioning event.

17. The system of claim 13, further comprising:
    a middleware services layer associated with one of the plurality of nodes; and
    a non-node participant in communication with the middleware services layer;
    wherein the non-node participant maintains a local token vault.

18. The system of claim 17, wherein one of the plurality of nodes comprises a watcher that detects the commitment of the token lifecycle event to the distributed token ledger and communicates the token lifecycle event to the non-node participant.

19. The method of claim 1, wherein the token lifecycle event further comprises a payment token provisioning event.

* * * * *